(12) United States Patent
Nakamoto et al.

(10) Patent No.: US 8,767,564 B2
(45) Date of Patent: Jul. 1, 2014

(54) FIELD COMMUNICATION SYSTEM AND FIELD COMMUNICATION METHOD

(75) Inventors: Yasuyuki Nakamoto, Tokyo (JP); Toshiyuki Emori, Tokyo (JP); Hideki Umemoto, Tokyo (JP); Hiroshi Mori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 592 days.

(21) Appl. No.: 13/048,240

(22) Filed: Mar. 15, 2011

(65) Prior Publication Data

US 2011/0228725 A1 Sep. 22, 2011

(30) Foreign Application Priority Data

Mar. 16, 2010 (JP) ................ P2010-058730

(51) Int. Cl.
*H04L 12/26* (2006.01)
(52) U.S. Cl.
USPC .......................................... 370/250; 370/252
(58) Field of Classification Search
None
See application file for complete search history.

(56) References Cited

U.S. PATENT DOCUMENTS

| | | | | |
|---|---|---|---|---|
| 6,947,389 | B1 * | 9/2005 | Chen et al. ................ | 370/252 |
| 8,224,256 | B2 * | 7/2012 | Citrano et al. ............ | 455/67.11 |
| 8,315,263 | B2 * | 11/2012 | Enns et al. ................ | 370/400 |
| 2009/0316628 | A1 * | 12/2009 | Enns et al. ............... | 370/328 |
| 2010/0190442 | A1 * | 7/2010 | Citrano et al. ............ | 455/41.2 |
| 2010/0290351 | A1 * | 11/2010 | Toepke et al. ............. | 370/250 |
| 2011/0191500 | A1 * | 8/2011 | Odayappan et al. ....... | 710/8 |

FOREIGN PATENT DOCUMENTS

| | | |
|---|---|---|
| JP | 2002-007166 A | 1/2002 |
| JP | 2004-128785 A | 4/2004 |
| WO | 2009-072699 A1 | 6/2009 |

OTHER PUBLICATIONS

European Search Report dated Jun. 30, 2011, issued in corresponding European Patent Application No. 11158132.8.
Stapp, M. et al.; "Interaction between DHCP and DNS< draft-ietf-dhc-dhcp-dns-12.tex>"; Cisco Systems, Inc, IETF Standard-Working-Draft, Internet Engineering Task Force, IETF, CH, vol. dhc, No. 12, Mar. 10, 2000, XP015016963. (cited in European Search Report dated Jun. 30, 2011).
"Wireless 5 systems for industrial automation: Process control and related applications"; ISA Standards, International Society of Automation, United States, No. ISA-100.11a-2009, Jan. 1, 2009, pp. 1-817, XP007918931. parts 1-24 (cited in European Search Report dated Jun. 30, 2011).

* cited by examiner

*Primary Examiner* — Jay P Patel
(74) *Attorney, Agent, or Firm* — Westerman, Hattori, Daniels & Adrian, LLP (57) ABSTRACT

A field communication system may perform wireless communication with field devices. The field communication system may include a connection allowing unit that determines whether or not to allow a connection to the field device by referring a field device list, the field device list listing tag names related to the field devices, an address issuance unit that automatically issues a communication address for the field device if the connection allowing unit allows the connection with the field device, an address management unit that establishes correspondences between the communication addresses and the tag names of the field devices by using the field device list, and a communication unit that transmits data to the field device designated by the tag name, the communication unit receiving the data transmitted from the field device, the data being used to control the field device designated by the tag name.

20 Claims, 5 Drawing Sheets

FIELD DEVICE LIST

| TAG NAME OF FIELD DEVICE | EUI-64 | NETWORK ID | JOIN KEY | IPv6 ADDRESS |
|---|---|---|---|---|
| FIC100 | yyyy:yyyy:yyyy:yyyy | 100 | "abcdefgh" | |
| FIC101 | zzzz:zzzz:zzzz:zzzz | 100 | "klmnop" | 2001:db8::9abd |
| | | | | |

| TAG NAME OF FIELD DEVICE | EUI-64 | NETWORK ID | JOIN KEY | IPv6 ADDRESS |
|---|---|---|---|---|
| FIC100 | yyyy:yyyy:yyyy:yyyy | 100 | "abcdefgh" | 2001:db8::9abc |
| FIC101 | zzzz:zzzz:zzzz:zzzz | 100 | "klmnop" | 2001:db8::9abd |
| | | | | |

FIG. 3B

CONVERSION TABLE

| TAG NAME OF FIELD DEVICE | IPv6 ADDRESS |
|---|---|
| FIC100 | 2001:db8::9abc |
| FIC101 | 2001:db8::9abd |
| | |

FIG. 4

ND COMMUNICATION SYSTEM AND
FIELD COMMUNICATION METHOD

BACKGROUND OF THE INVENTION

1. Field of the Invention

The present invention relates to a field communication system that performs wireless communication with field devices. Also, the present invention relates to a field communication method by which wireless communication with the field devices is performed.

Priority is claimed on Japanese Patent Application No. 2010-058730, filed Mar. 16, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

When controlling a wireless field device based on the ISA100.11a field wireless standard, a distributed field control system accesses internal parameters of the wireless field device via a gateway based on the ISA100.11a field wireless standard. An interface for accessing the wireless field device is a GSAP (Gateway Service Access Point) prescribed in the ISA100.11a field wireless standard, and is designated to use an IPv6 address as a parameter that specifies the wireless field device. Also, in the ISA100.11a field wireless standard, a system manager, which exists only one in a network of the ISA100.11a field wireless standard, sets an IPv6 address in the field device. The system manager automatically generates different IPv6 addresses for respective field devices, and sets the generated IPv6 addresses in the field devices, respectively. The algorithm that automatically generates the IPv6 addresses depends on the vendor that provides the system manager.

On the other hand, in the field control system, it is common practice to use a tag name of a field device as a parameter that identifies the field device. The tag name of the field device is expressed as a character string, and a user of the system freely determines and allocates a tag name to the field device.

When the field control system accesses a field device by using a GSAP that is defined in the ISA100.11a field wireless standard, a conversion table for converting the tag name of the field device into an IPv6 address is required.

However, in a large-scale system, engineering such as offline engineering of the system is performed in an environment in which the field device is not connected to the system. In this case, in order for an engineer to prepare a conversion table, it is required that the engineer is aware of the algorithm when the system manager, which is used in the field control system, automatically generates the IPv6 address. However, since the algorithm depends on the vendor, in practice, the engineer cannot aware of the algorithm. Accordingly, it is not possible to prepare the conversion table in the offline engineering environment.

Also, when exchange of the field device is performed, whether or not the system manager generates the same IPv6 address value as before the exchange depends on the algorithm of the system manager. When an IPv6 address which is different from the IPv6 address before the exchange is generated, it is required to update the conversion table. That is, when exchanging the field device, the field control system is required to perform re-engineering.

SUMMARY

A field communication system may perform wireless communication with field devices. The field communication system may include a connection allowing unit that determines whether or not to allow a connection to the field device by referring a field device list, the field device list listing tag names related to the field devices, an address issuance unit that automatically issues a communication address for the field device if the connection allowing unit allows the connection with the field device, an address management unit that establishes correspondences between the communication addresses and the tag names of the field devices by using the field device list, and a communication unit that transmits data to the field device designated by the tag name, the communication unit receiving the data transmitted from the field device, the data being used to control the field device designated by the tag name.

A field communication system may include field devices that perform wireless communication, a manipulation monitoring device that transmits data to the field devices, the manipulation monitoring device receiving the data transmitted from the field devices; a gateway device that is a gateway disposed between the field devices and the manipulation monitoring device, the gateway device performing the wireless communication with the field devices, and a field bus that connects the manipulation monitoring device to the gateway device. The gateway device may include a field device list storage unit that stores a field device list, the field device list listing tag names related to the field devices, a connection allowing unit that determines whether or not to allow a connection to the field device by referring the field device list, an address issuance unit that automatically issues a communication address for the field device if the connection allowing unit allows the connection with the field device, an address management unit that establishes correspondences between the communication addresses and the tag names of the field devices by using the field device list, and a communication unit that transmits the data to the field device designated by the tag name, the communication unit receiving the data transmitted from the field device, the data being used to control the field device designated by the tag name.

A field communication method may perform wireless communication with field devices. The field communication method may include determining whether or not to allow a connection to the field device by referring a field device list, the field device list listing tag names related to the field devices, automatically issuing a communication address for the field device if the connection with the field device is allowed, establishing correspondences between the communication addresses and the tag names of the field devices by using the field device list, and transmitting data to the field device designated by the tag name, receiving the data transmitted from the field device, the data being used to control the field device designated by the tag name.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the present invention is not limited to the embodiments illustrated herein for explanatory purposes.

A field communication system may perform wireless communication with field devices. The field communication system may include a connection allowing unit that determines whether or not to allow a connection to the field device by referring a field device list, the field device list listing tag names related to the field devices, an address issuance unit that automatically issues a communication address for the field device if the connection allowing unit allows the connection with the field device, an address management unit that establishes correspondences between the communication addresses and the tag names of the field devices by using the field device list, and a communication unit that transmits data to the field device designated by the tag name, the communication unit receiving the data transmitted from the field device, the data being used to control the field device designated by the tag name.

The communication unit may transmit an access request that requests the connection to the field device. If the address management unit receives the access request, then the address management unit may establish the correspondence between the communication address and the tag name of the field device.

The address management unit may monitor the address issuance unit issuing the communication address. Each time the address issuance unit issues the communication address, the address management unit may establish the correspondence between the communication address and the tag name of the field device.

The connection allowing unit may identify the field device based on a device ID that is specific to the field device. The connection allowing unit may determine whether or not to allow the connection between the field device and the communication unit by referring the device ID.

The field communication system may further include a gateway apparatus that is connected to a field bus and is disposed between the field device and the field bus, the gateway apparatus comprising the connection allowing unit, the address issuance unit, the address management unit, and the communication unit.

The field communication system may further include a manipulation monitoring device that transmits the data to the field devices, the manipulation monitoring device receiving the data transmitted from the field devices.

The field communication system may further include a management terminal that performs engineering of the field communication system.

The field communication system may further include a GSAP (Gateway Service Access Point) that performs the wireless communication with the field device based on an ISA100.11a field wireless standard.

The communication address may be an IPv6 address.

The field device list may list provisioning data and the communication address, the provisioning data includes the tag name, an EUI-64, a network ID, and a join key, the EUI-64 is a device ID that is specific to the field device, and the join key is a password that is used when performing the connection.

The field communication system may further include a conversion table storage unit that stores a conversion table, the conversion table listing the tag name of the field device and the communication address. The address management unit may update the conversion table if the field device list is updated.

A field communication system may include field devices that perform wireless communication, a manipulation monitoring device that transmits data to the field devices, the manipulation monitoring device receiving the data transmitted from the field devices; a gateway device that is a gateway disposed between the field devices and the manipulation monitoring device, the gateway device performing the wireless communication with the field devices, and a field bus that connects the manipulation monitoring device to the gateway device. The gateway device may include a field device list storage unit that stores a field device list, the field device list listing tag names related to the field devices, a connection allowing unit that determines whether or not to allow a connection to the field device by referring the field device list, an address issuance unit that automatically issues a communication address for the field device if the connection allowing unit allows the connection with the field device, an address management unit that establishes correspondences between the communication addresses and the tag names of the field devices by using the field device list, and a communication unit that transmits the data to the field device designated by the tag name, the communication unit receiving the data transmitted from the field device, the data being used to control the field device designated by the tag name.

The communication unit may transmit an access request that requests the connection to the field device. If the address management unit receives the access request, then the address management unit may establish the correspondence between the communication address and the tag name of the field device.

The address management unit may monitor the address issuance unit issuing the communication address. Each time the address issuance unit issues the communication address, the address management unit may establish the correspondence between the communication address and the tag name of the field device.

The connection allowing unit may identify the field device based on a device ID that is specific to the field device, and the connection allowing unit determines whether or not to allow the connection between the field device and the communication unit by referring the device ID.

The gateway device may further include a conversion table storage unit that stores a conversion table, the conversion table listing the tag name of the field device and the communication address. The address management unit may update the conversion table if the field device list is updated.

A field communication method may perform wireless communication with field devices. The field communication method may include determining whether or not to allow a connection to the field device by referring a field device list, the field device list listing tag names related to the field devices, automatically issuing a communication address for the field device if the connection with the field device is allowed, establishing correspondences between the communication addresses and the tag names of the field devices by using the field device list, and transmitting data to the field device designated by the tag name, receiving the data transmitted from the field device, the data being used to control the field device designated by the tag name.

The field communication method may further include transmitting an access request that requests the connection to the field device, and establishing the correspondence between the communication address and the tag name of the field device if the access request is transmitted.

The field communication method may further include establishing the correspondence between the communication address and the tag name of the field device, each time the communication address is issued.

The field communication method may further include identifying the field device based on a device ID that is specific to the field device, and determining whether or not to allow the connection to the field device by referring the device ID.

By using a field communication system in accordance with a preferred embodiment of the present invention, the burden in performing engineering for communicating with the wireless field device can be reduced.

In a field communication system in accordance with a preferred embodiment of the present invention, an issued communication address is made to correspond to a tag name of a corresponding field device using a device list, and thus engineering for making the communication address correspond to the tag name of field device of the corresponding field device becomes unnecessary.

A field communication system in accordance with a first preferred embodiment of the present invention will be described.

Figure 1:
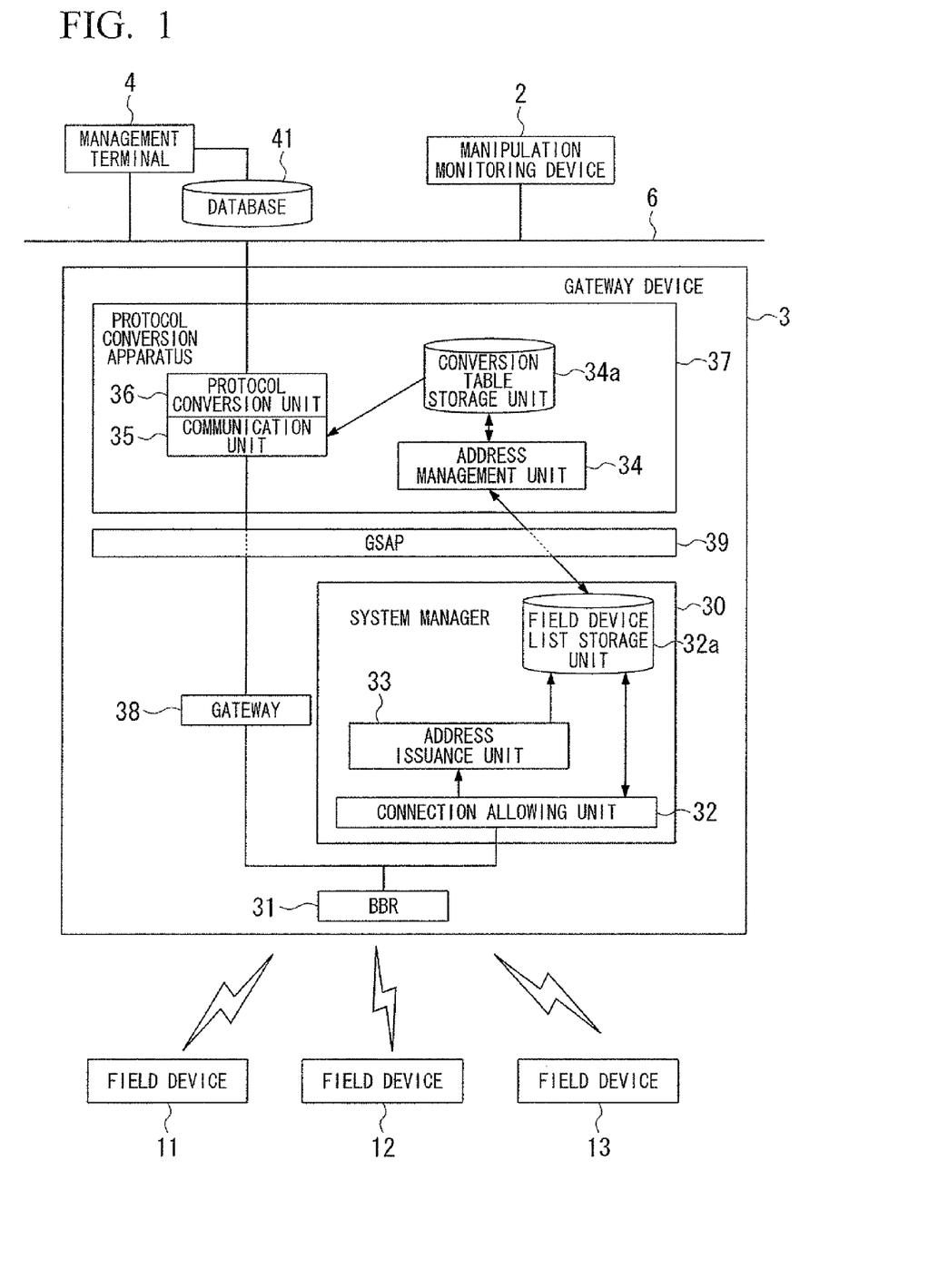
FIG. 1 is a block diagram illustrating a configuration example of a distributed field control system including a field communication system in accordance with a first preferred embodiment of the present invention.

FIG. 1 is a block diagram illustrating a configuration example of a distributed field control system including a field communication system in accordance with the first preferred embodiment of the present invention.

The field communication system includes a manipulation monitoring device 2, a gateway device 3, a management terminal 4, and a field bus 6. The manipulation monitoring device 2, the gateway device 3, and the management terminal 4 are connected to the field bus 6. Field devices 11, 12 and 13 are arranged in a plant. The gateway device 3 performs a wireless communication with each of the field devices 11, 12 and 13 based on the ISA100.11a field wireless standard. The manipulation monitoring device 2 performs communication with each of the field devices 11, 12 and 13 through the gateway device 3 and the field bus 6. The management terminal 4 performs engineering of the distributed field control system.

A measured value that is acquired by the field device 1 is transmitted from the field devices 11, 12 and 13 to the manipulation monitoring device 2 through the gateway device 3. A manipulation value is transmitted from the manipulation monitoring device 2 to the field devices 11, 12 and 13. The gateway 3 performs wireless communication with each of the field devices 11, 12 and 13 in a publish/subscribe manner based on the ISA100.11a field wireless standard.

The gateway device 3 includes a system manager 30, a BBR (Back Bone Router) 31, a protocol conversion apparatus 37, a gateway 38, and a GSAP (Gateway Service Access Point) 39. The BBR 31 performs wireless communication with each of the field devices 11, 12 and 13. The system manager 30 manages the wireless communication based on the ISA100.11a field wireless standard. The GSAP 39 is an interface for accessing the field devices 11, 12 and 13 that is prescribed in the ISA100.11a field wireless standard.

The system manager 30 includes a connection allowing unit 32, a field device list storage unit 32a, and an address issuance unit 33. The field device list storage unit 32a stores a field device list that lists tag names of the field devices 11, 12 and 13. Each of the tag names corresponds to each of the field devices 11, 12 and 13. The connection allowing unit 32 determines whether or not to allow a connection to a field device after confirming the field device and the field device list. The address issuance unit 33 automatically issues a communication address of a corresponding field device if the connection allowing unit 32 allows the connection.

The protocol conversion apparatus 37 includes an address management unit 34, a conversion table storage unit 34a, a communication unit 35, and a protocol conversion unit 36. The address management unit 34 establishes a correspondence between the communication address, which is issued by the address issuance unit 33, correspond to the tag name of the corresponding field device by using the field device list. The communication unit 35 receives/transmits data from/to the field device designated by the corresponding tag name through the wireless communication, which is performed by using the communication address that corresponds to the tag name of the field device.

In the GSAP 39 that is operated based on in the ISA100.11a field wireless standard, an IPv6 address is used as a parameter for identifying the field devices 11, 12 and 13. The IPv6 address is 16-byte numeral data. The system manager 30 sets the IPv6 address as a unique value to each of the field devices 11, 12 and 13. Here, the system manager 30 exists only one in the network of the ISA100.11a field wireless standard. In the example illustrated in FIG. 1, the system manager 30 is included in the gateway device 3, but the system manager 30 may be disposed outside of the gateway device 3.

The system manager 30 automatically generates different IPv6 addresses for the field devices 11, 12 and 13, and sets the generated IPv6 addresses to the field devices 11, 12 and 13, respectively. The algorithm by which the IPv6 addresses are automatically generated depends on the vendor that provides the system manager 30.

Figure 2A:
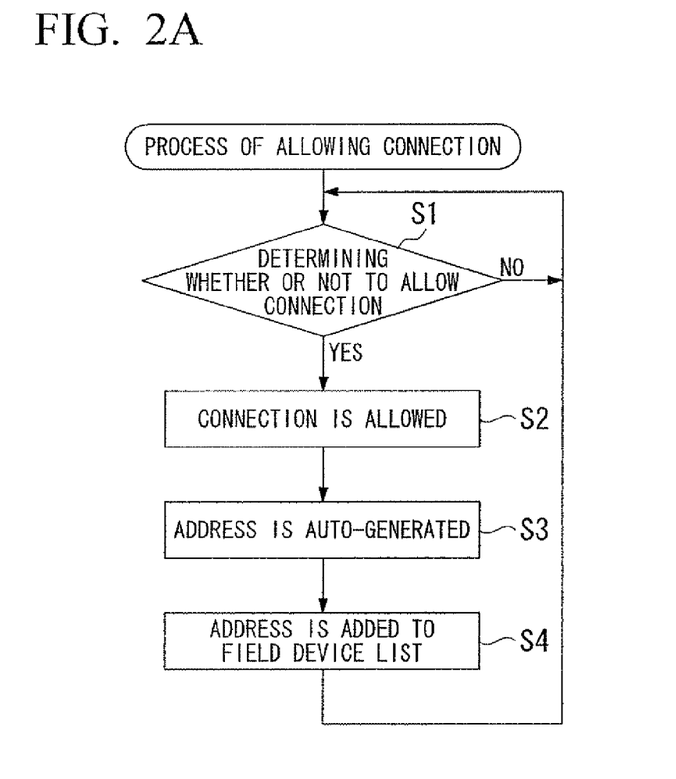
FIG. 2A is a flowchart illustrating an operation of a gateway device in accordance with the first preferred embodiment of the present invention.
Figure 2B:
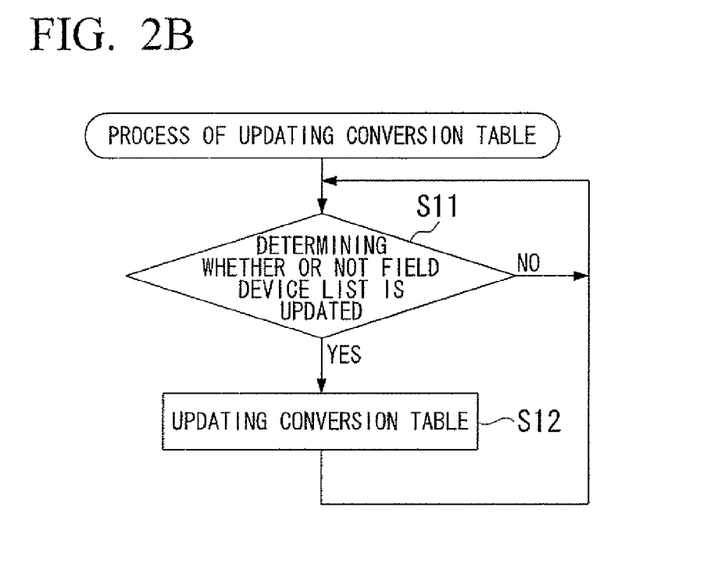
FIG. 2B is a flowchart illustrating an operation of a gateway device in accordance with the first preferred embodiment of the present invention.
Figure 2C:
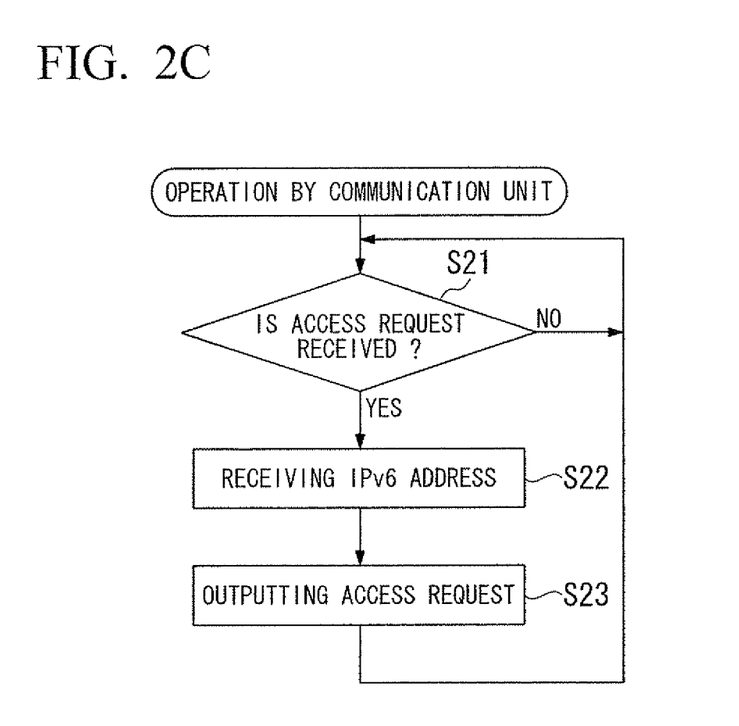
FIG. 2C is a flowchart illustrating an operation of a gateway device in accordance with the first preferred embodiment of the present invention.

FIGS. 2A, 2B and 2C are flowcharts illustrating an operation of the gateway device 3. Steps S1 to S4 of FIG. 2A represent a process of allowing connection with the field device 1.

In step S1, the connection allowing unit 32 receives a connection request from the field device 1, and determines whether or not to allow the connection by referring the field device list.

The connection allowing unit 32 compares new provisioning data, which is acquired by wireless communication from the field device that is requested to connect, with old provisioning data, which is listed in the field device list in advance. If the new provisioning data and the old provisioning data coincide with each other, then the determination in step S1 becomes positive and the process proceeds to step S2. If the new provisioning data and the old provisioning data do not coincide with each other, then the determination in step S1 becomes negative.

If the determination in step S1 becomes positive, then in step S2, the connection allowing unit 32 allows the connection to the field device 1 and the process proceeds to step S3.

In step S3, the address issuance unit 33 automatically generates and provides the IPv6 address to the field device and the process proceeds to step S4. In step S4, the generated IPv6 address is added to the field device list.

Figure 3A:
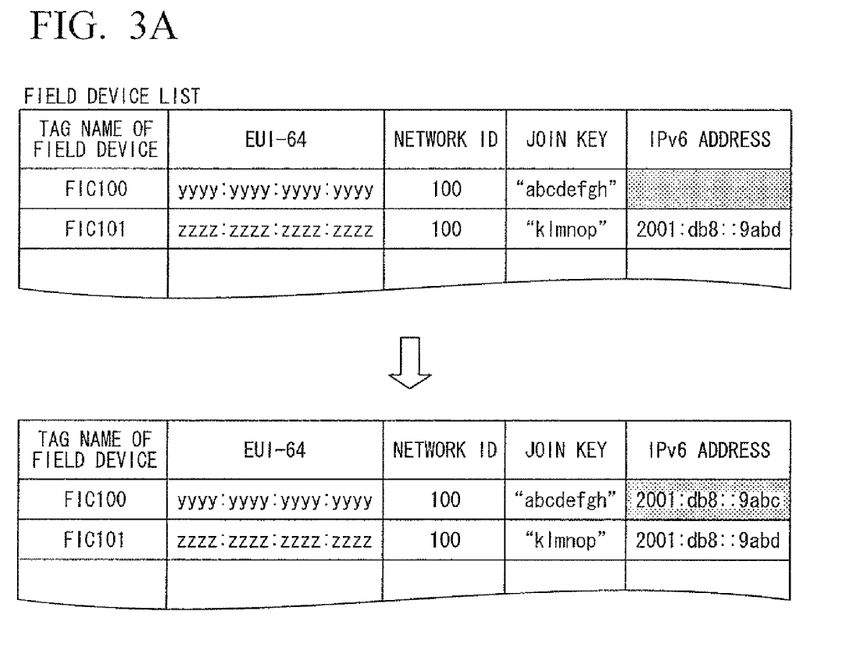
FIG. 3A is a diagram illustrating a configuration example of a device list in accordance with the first preferred embodiment of the present invention.

FIG. 3A is a diagram illustrating a configuration example of a field device list. As illustrated in FIG. 3A, the field device list has fields of "tag name of field device", "EUI-64", "network ID", "join key", and "IPv6 address" for each of the field devices 11, 12 and 13. The "EUI-64" is a specific device ID attached to each of the field devices 11, 12 and 13. The "join key" is a password that is given to secure the security for allowing the connection. The "tag name of field device", "EUI-64", "network ID", and "join key" correspond to the provisioning data.

The provisioning data is set in advance in the field device and in the field device list. In step S3, the provisioning data stored the field device is compared with the provisioning data stored in the field device list. In step S3, the IPv6 address has not yet been issued, and the field of "IPv6 address" of the field device list is made blank.

If the IPv6 address is generated by the address issuance unit 33, then in step S4, a newly generated IPv6 address is written in the field of "IPv6 address" of the corresponding field device which had been blank. For example, as indicated by a hatched portion in FIG. 3A, if an IPv6 address is issued to a field device that is specified as a tag name "FIC100", then the IPv6 address is written in the field "IPv6 address" of the corresponding field device.

If the operation in step S4 has been finished, then the process returns to step S1.

In step S1, the connection allowing unit 32 specifies the field device based on the EUI-64. Accordingly, if the field device is exchanged by a different field device even in the case of exchange by the same kind of device having the same tag name of the field device attached thereto, the connection allowing unit 32 recognizes the new field device as a field device different from the previous field device, and the process in steps S1 to S4 is executed. Thereby, a new IPv6 address corresponding to the new field device is issued.

Steps S11 and S12 of FIG. 2B represent the process of updating the conversion table by the address management unit 34.

In step S11, the address management unit 34 determines whether or not there is an update in the field device list, for example, by periodically monitoring the field device list storage unit 32a. If the determination is positive, the process proceeds to step S12.

In step S12, the address management unit 34 updates the conversion table stored in the conversion table storage unit 34a so that the conversion table corresponds to the updated field device list, and the process returns to step S11.

Figure 3B:
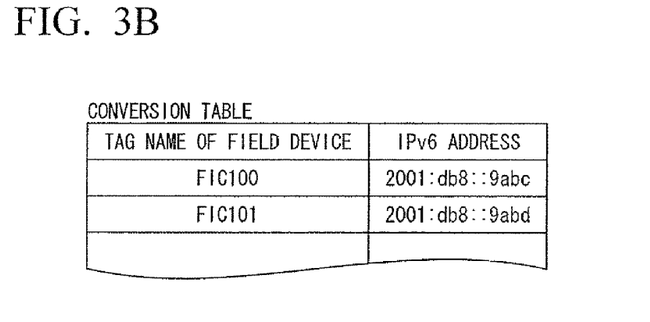
FIG. 3B is a diagram illustrating a configuration example of a conversion table in accordance with the first preferred embodiment of the present invention.

FIG. 3B is a diagram illustrating a configuration example of the conversion table. In the example of FIG. 3B, the configuration of the conversion table corresponds to the field device list illustrated in FIG. 3A. As illustrated in FIGS. 3A and 3B, the conversion table describes a relationship between a "tag name of field device" and an "IPv6 address" indicated in the field device list.

In steps S11 and S12, update of the field device list is monitored at all times and the conversion table is updated whenever the field device list is updated. Only a corresponding portion for the conversion table may be updated based on an access request for the field device. For example, if there is an access request for the field device, the contents of the record may be reflected in the conversion table with reference to the record of the corresponding field device that is listed in the field device list.

Steps S21 to S23 of FIG. 2C represent the processing of the communication unit 35.

In step S21, if the communication unit 35 receives an access request for the field device that has already been allowed to connect, then the process proceeds to step S22. The access request received in step S21 includes an access request from the manipulation monitoring device 2 and an access request from other devices through the field bus 6. In the access request, the field device that is the subject of communication is designated using the tag name of field device, but the IPv6 address is not designated.

In step S22, the communication unit 35 refers the conversion table to acquire the IPv6 address that is allocated to the field device that is the subject of the access request. In the example illustrated in FIG. 3B, if there is an access request for a tag name "FIC100", then the communication unit 35 acquires an IPv6 address "2001:db8::9abc" from the conversion table.

Next, in step S23, the communication unit 35 transmits the access request with respect to the IPv6 address that is acquired in step S22, and the process returns to step S21. The access request is transmitted to the corresponding field device through BBR 31.

As described above, by converting the tag name of the field device into the IPv6 address using the conversion table, it becomes possible to perform communication between the gateway device 3 and the field device.

Next, an example of an operation of the provisioning will be described. The operation of the provisioning corresponds to the whole process in steps S1 to S4. By the operation of the provisioning, a new field device is allowed to be connected to. In the following operational procedure, provisioning for the field device and provisioning for the gateway device 3 are executed as a series of operations to seek the operational efficiency. The provisioning for the field device and the provisioning for the gateway device 3 may be performed as separate operations.

Figure 4:
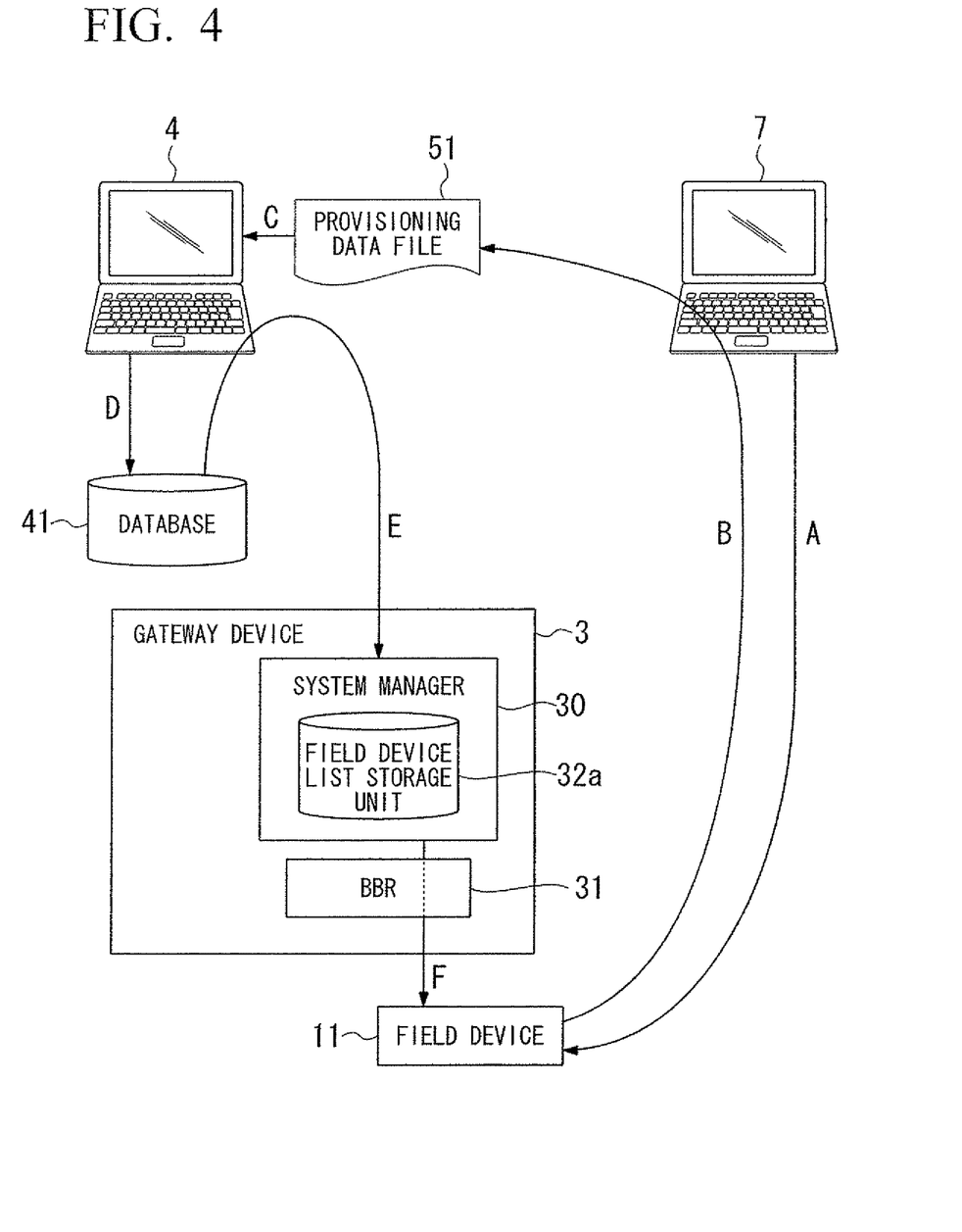
FIG. 4 is a diagram illustrating an example of an operational procedure of provisioning in accordance with the first preferred embodiment of the present invention.

FIG. 4 is a diagram illustrating an example of an operational procedure of the provisioning.

An operator who performs provisioning of a field device 11 inputs a network ID of a network, which the field device is connected to, and a tag name, which is given to the field device 11, to a provisioning device 7. The provisioning device 7 receives the input of the network ID and the tag name of the field device 11. Then the provisioning device 7 automatically generates a join key. Further, as indicated by an arrow A in FIG. 4, the provisioning device 7 transmits the network ID, the tag name and the join key to the field device 11, and the network ID, the tag name, and the join key are set in the field device 11.

Then, as indicated by an arrow B in FIG. 4, the provisioning device 7 acquires the EUI-64 from the field device 11. The provisioning device 7 stores the network ID, the tag name of field device 11, the join key, and the EUI-64, which are corresponding to one another, in a provisioning data file 51.

A system engineer performs engineering based on the tag name by using the management terminal 4. Information of the engineering performed in the management terminal 4 is stored in a database 41.

As indicated by an arrow C in FIG. 4, the system engineer loads the provisioning data file 51, which is prepared by the provisioning device 7, on an engineering tool that is mounted on the management terminal 4. The engineering tool generates a desired list in which the contents of the provisioning data file are expressed as a table with the tag name as a key. Then, as indicated by an arrow D in FIG. 4, the engineering tool stores the desired list in the database 41. Further, as indicated by an arrow E in FIG. 4, the system engineer makes the desired list in the database 41 loaded on the system manager 30 in the gateway device 3.

By the above-described operation, the tag name of the field device 11, the EUI-64, the network ID, and the join key, which are the provisioning data, are given to both the field device 11 and the system manager 30. The desired list loaded on the system manager 30 is reflected in the field device list.

Thereafter, the process of allowing connection in steps S1 to S4 is executed as indicated by an arrow F in FIG. 4.

As described above, the conversion table, which lists the tag name of the field device and the IPv6 address corresponding to each other, is installed on the gateway device 3 in the field communication system in accordance with a preferred embodiment of the present invention. Thereby, it becomes possible to perform a conversion between the tag name of the field device and the IPv6 address on a communication path. In the field control system including the field bus 6, it becomes possible to specify the field device using the tag name of the field device. Also, the conversion table may be widely used in the field control system. A preserver of the field device may use the conversion table as preservation information. Also, it becomes possible to display statistical information and so on of the field device by using the tag name.

The conversion table is generated and updated based on the provisioning data that is required in allowing the connection to the field device. Thereby, the engineering for making the tag name of the field device and the IPv6 address corresponding to each other becomes unnecessary. Further, since it is not necessary for the field control system to be conscious of the IPv6 address of the field device, the engineering that uses the IPv6 address also becomes unnecessary.

Further, since the conversion table is automatically updated based on the field device list even if the exchange of the field device has been performed, the re-engineering on the field control system does not occur, and thus the tag name of the field device before the exchange may be constantly used as it is.

In the above description, the conversion table is stored in the conversion table storage unit 34a inside the gateway device 3, but the place where the conversion table is stored is arbitrary.

In the above description, when the IPv6 address is generated automatically, the IPv6 address is written in the device list. However, an address table that establishes a correspondence between the EUI-64 and the IPv6 address may be separately disposed, and new correspondence may be described in the address table instead of writing the IPv6 address in the device list. In this case, the address management unit 34 may establish a correspondence between the IPv6 address and the tag name of field device through the EUI-64 by using the device list and the address table.

The present invention is not limited to the above-described embodiments. The present invention may be widely applied to a filed communication system or the like which transmits/receives process data to/from the field device through wireless communication.

As used herein, the following directional terms "forward, rearward, above, downward, right, left, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "unit" is used to describe a component, section or part of a hardware and software that is constructed and programmed to carryout the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field communication system that performs wireless communication with field devices, the field communication system comprising:
 a connection allowing unit configured to determine whether or not to allow a connection to the field device by referring a field device list, the field device list listing tag names related to the field devices;
 an address issuance unit configured to automatically issue a communication address for the field device if the connection allowing unit allows the connection with the field device;
 an address management unit configured to establish correspondences between the communication addresses and the tag names of the field devices by using the field device list; and
 a communication unit configured to transmit data to the field device designated by the tag name, the communication unit receiving the data transmitted from the field device, the data being used to control the field device designated by the tag name, wherein,
 the field device list lists a device ID for specifying the field device and the tag name attached to the field device,
 the connection allowing unit is configured to allow the connection if the device ID and the tag name that are acquired from the field device that is requested to connect coincide with a description in the field device list, and the address issuance unit is configured to issue the communication address that is unique to each of the field devices specified by the device ID.

2. The field communication system according to claim 1, wherein
the communication unit is configured to transmit an access request that requests the connection to the field device, and
if the address management unit receives the access request, then the address management unit establishes the correspondence between the communication address and the tag name of the field device.

3. The field communication system according to claim 1, wherein
the address management unit is configured to monitor the address issuance unit issuing the communication address, and
each time the address issuance unit issues the communication address, the address management unit establishes the correspondence between the communication address and the tag name of the field device.

4. The field communication system according to claim 1, wherein
the connection allowing unit is configured to identify the field device based on the device ID that is specific to the field device, and
the connection allowing unit is configured to determine whether or not to allow the connection between the field device and the communication unit by referring the device ID.

5. The field communication system according to claim 1, further comprising:
a gateway apparatus that is connected to a field bus and is disposed between the field device and the field bus, the gateway apparatus comprising the connection allowing unit, the address issuance unit, the address management unit, and the communication unit.

6. The field communication system according to claim 1, further comprising:
a manipulation monitoring device configured to transmit the data to the field devices, the manipulation monitoring device receiving the data transmitted from the field devices.

7. The field communication system according to claim 1, further comprising:
a management terminal configured to perform engineering of the field communication system.

8. The field communication system according to claim 1, further comprising:
a GSAP (Gateway Service Access Point) configured to perform the wireless communication with the field device based on an ISA100.11a field wireless standard.

9. The field communication system according to claim 1, wherein the communication address is an IPv6 address.

10. The field communication system according to claim 1, wherein the field device list lists provisioning data and the communication address, the provisioning data includes the tag name, an EUI-64, a network ID, and a join key, the EUI-64 is the device ID that is specific to the field device, and the join key is a password that is used when performing the connection.

11. The field communication system according to claim 1, further comprising:
a conversion table storage unit configured to store a conversion table, the conversion table listing the tag name of the field device and the communication address, and
wherein the address management unit is configured to update the conversion table if the field device list is updated.

12. A field communication system comprising:
field devices configured to perform wireless communication;
a manipulation monitoring device configured to transmit data to the field devices, the manipulation monitoring device being configured to receive the data transmitted from the field devices;
a gateway device that is a gateway disposed between the field devices and the manipulation monitoring device, the gateway device being configured to perform the wireless communication with the field devices; and
a field bus that connects the manipulation monitoring device to the gateway device, and
wherein the gateway device comprises:
a field device list storage unit configured to store a field device list, the field device list listing tag names related to the field devices;
a connection allowing unit configured to determine whether or not to allow a connection to the field device by referring the field device list;
an address issuance unit configured to automatically issue a communication address for the field device if the connection allowing unit allows the connection with the field device;
an address management unit configured to establish correspondences between the communication addresses and the tag names of the field devices by using the field device list, and
a communication unit configured to transmit the data to the field device designated by the tag name, the communication unit receiving the data transmitted from the field device, the data being used to control the field device designated by the tag name, wherein,
the field device list lists a device ID for specifying the field device and the tag name attached to the field device,
the connection allowing unit is configured to allow the connection if the device ID and the tag name that are acquired from the field device that is requested to connect coincide with a description in the field device list, and
the address issuance unit is configured to issue the communication address that is unique to each of the field devices specified by the device ID.

13. The field communication system according to claim 12, wherein
the communication unit is configured to transmit an access request that requests the connection to the field device,
if the address management unit receives the access request, then the address management unit establishes the correspondence between the communication address and the tag name of the field device.

14. The field communication system according to claim 12, wherein
the address management unit is configured to monitor the address issuance unit issuing the communication address, and
each time the address issuance unit issues the communication address, the address management unit establishes the correspondence between the communication address and the tag name of the field device.

15. The field communication system according to claim 12, wherein the connection allowing unit is configured to identify the field device based on the device ID that is specific to the field device, and the connection allowing unit is configured to determine whether or not to allow the connection between the field device and the communication unit by referring the device ID.

16. The field communication system according to claim 12, wherein the gateway device further comprises:

a conversion table storage unit configured to store a conversion table, the conversion table listing the tag name of the field device and the communication address, and wherein the address management unit is configured to update the conversion table if the field device list is updated.

17. A field communication method that performs wireless communication with field devices, the field communication method comprising:

determining whether or not to allow a connection to the field device by referring a field device list, the field device list listing tag names related to the field devices, the field device list listing a device ID for specifying the field device and the tag name attached to the field device;

automatically issuing a communication address for the field device if the connection with the field device is allowed;

establishing correspondences between the communication addresses and the tag names of the field devices by using the field device list;

transmitting data to the field device designated by the tag name, receiving the data transmitted from the field device, the data being used to control the field device designated by the tag name;

allowing the connection if the device ID and the tag name that are acquired from the field device that is requested to connect coincide with a description in the field device list, and issuing the communication address that is unique to each of the field devices specified by the device ID.

18. The field communication method according to claim 17, further comprising:

transmitting an access request that requests the connection to the field device; and establishing the correspondence between the communication address and the tag name of the field device if the access request is transmitted.

19. The field communication method according to claim 17, further comprising:

establishing the correspondence between the communication address and the tag name of the field device, each time the communication address is issued.

20. The field communication method according to claim 17, further comprising:

identifying the field device based on the device ID that is specific to the field device; and determining whether or not to allow the connection to the field device by referring the device ID.

* * * * *